(12) United States Patent
Shin

(10) Patent No.: US 8,773,952 B2
(45) Date of Patent: Jul. 8, 2014

(54) APPARATUS AND METHOD TO TRACK POSITIONS OF MULTIPLE SOUND SOURCES

(75) Inventor: Ki Hoon Shin, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 338 days.

(21) Appl. No.: 12/911,836

(22) Filed: Oct. 26, 2010

(65) Prior Publication Data
US 2011/0103191 A1    May 5, 2011

(30) Foreign Application Priority Data
Oct. 30, 2009  (KR) .................. 10-2009-0104665

(51) Int. Cl.
*G01S 3/80* (2006.01)
*G01S 3/808* (2006.01)

(52) U.S. Cl.
CPC .................. *G01S 3/8083* (2013.01)
USPC ........................................ 367/125

(58) Field of Classification Search
USPC .......................................... 367/125
See application file for complete search history.

(56) References Cited

U.S. PATENT DOCUMENTS

| | | | | |
|---|---|---|---|---|
| 2005/0047611 A1* | 3/2005 | Mao | | 381/94.7 |
| 2005/0091042 A1* | 4/2005 | Acero et al. | | 704/205 |
| 2005/0240642 A1* | 10/2005 | Parra et al. | | 708/400 |
| 2006/0058983 A1* | 3/2006 | Araki et al. | | 702/190 |
| 2006/0245601 A1* | 11/2006 | Michaud et al. | | 381/92 |
| 2009/0055170 A1* | 2/2009 | Nagahama | | 704/226 |
| 2009/0310444 A1* | 12/2009 | Hiroe | | 367/125 |

* cited by examiner

*Primary Examiner* — Isam Alsomiri
*Assistant Examiner* — James Hulka
(74) *Attorney, Agent, or Firm* — Staas & Halsey LLP

(57) ABSTRACT

Disclosed herein is an apparatus and method to track positions of multiple sound sources which can simultaneously track the positions of multiple sound sources. Sound signals input to an array of microphones are separated into independent sound source signals, correlation coefficients between the sound signals input to the microphones and the separated sound source signals are estimated, and the estimated correlation coefficients are analyzed to track the positions of the sound sources.

25 Claims, 8 Drawing Sheets

APPARATUS AND METHOD TO TRACK POSITIONS OF MULTIPLE SOUND SOURCES

CROSS-REFERENCE TO RELATED APPLICATIONS

This application claims the priority benefit of Korean Patent Application No. 10-2009-0104665, filed on Oct. 30, 2009 in the Korean Intellectual Property Office, the disclosure of which is incorporated herein by reference.

BACKGROUND

1. Field

Embodiments discussed herein relate to an apparatus and method to track positions of multiple sound sources, which can simultaneously track positions of multiple sound sources.

2. Description of the Related Art

Technologies to track the position of a sound source are used not only for electronic appliances but also for devices such as a service robot that supports household affairs, a surveillance camera that tracks a sound source to monitor intruders, and a video camera used for multipoint video conferencing.

Great efforts have been made on research and development of an apparatus and method to track the position of a sound source by analyzing signals input to a microphone array including a number of microphones arranged in series or parallel.

In one method that can be considered, the respective input signals of the microphones are compensated according to sound wave arrival time differences due to the differences between the lengths of sound wave propagation paths from the position of the sound source to the microphones and an angle at which the power of the sum of the compensated signals is maximized is found to determine the position of the sound source.

However, it is difficult to apply the conventional sound source position tracking to actual environments since it is designed to track one sound source or to track one sound source having a relatively high sound pressure level among multiple sound sources. For example, a technology to simultaneously track a plurality of sound sources is needed to allow a service robot to clearly identify a voice of the owner and to correctly execute commands thereof in environments in which a variety of household noise such as TV noise, vacuum cleaner noise, washing machine noise, doorbells, conversation between family members, and outdoor noise are present.

To track the positions of target sound sources such as a speaker's voice in real time and to correctly execute user commands in an environment in which a variety of noise is present, it is necessary to separate signals received from a microphone array into sound source signals and to determine the positions of the sound sources based on the sound source signals.

The conventional sound source position tracking requires a large amount of calculation when tracking sound sources since it requires a process to detect sound source signals in all directions, a time-to-frequency conversion process, and a frequency-to-time conversion process.

SUMMARY

Therefore, it is an aspect of the embodiments to provide an apparatus and method to track positions of multiple sound sources, which can simultaneously track the positions of multiple sound sources.

It is another aspect of the embodiments to provide an apparatus and method to track positions of multiple sound sources, which can correctly track the positions of sound sources in environments in which a variety of noise is present.

It is a further aspect of the embodiments to provide an apparatus and method to track positions of multiple sound sources, which can reduce the amount of calculation for sound source tracking.

Additional aspects of the embodiments will be set forth in part in the description which follows and, in part, will be obvious from the description, or may be learned by practice of the embodiments.

In accordance with one aspect of the embodiments, an apparatus to track positions of multiple sound sources includes a microphone array to which sound signals of a plurality of sound sources are input, a sound source separator to separate the sound signals input to the microphone array into independent sound source signals, a target sound source selector to select a target sound source to be tracked by analyzing patterns of the separated sound source signals, a correlation coefficient estimator to estimate correlation coefficients between the sound signals input to the microphone array and the separated sound source signals and to create a correlation coefficient matrix using the estimated correlation coefficients, and a sound source position estimator to estimate a position of the selected target sound source using the estimated correlation coefficients.

The sound source separator performs sound source separation using a blind source separation (BSS) method.

The BSS method includes one of independent component analysis (ICA) and geometric source separation (GSS).

The target sound source selector selects the target sound source by matching patterns of the separated sound source signals with a preset target sound source signal pattern.

The target sound source selector generates an index for identifying the selected target sound source.

The correlation coefficient estimator obtains correlation coefficients by performing cross-correlation between the sound signals input to the microphone array and the separated sound source signals.

If a plurality of target sound sources to be tracked is present, the sound source position estimator performs simultaneous position tracking on the plurality of target sound sources.

The sound source position estimator rearranges all correlation coefficients of the target sound source according to magnitudes of the correlation coefficients thereof and tracks a position of the target sound source using a global coordinate of the target sound source estimated using a preset number of correlation coefficients among the rearranged correlation coefficients.

The microphone array includes a plurality of microphones arranged at substantially equal intervals in a circle and the sound source position estimator estimates a global coordinate $\psi_i$ of an ith target sound source using Expression 7:

$$\psi_i = \omega_j + \phi_i, \quad \text{(Expression 7)}$$

where $\omega_j$ is a global coordinate of a jth microphone corresponding to a largest correlation coefficient with respect to a reference position of the microphone array, $\phi_i$ is a local coordinate of the ith target sound source with respect to the jth microphone, the global coordinate $\psi_i$ of the ith target sound source represents an angle of the ith target sound source relative to the reference position of the microphone array, the global coordinate $\omega_j$ of the jth microphone represents an angle of the jth microphone corresponding to the largest correlation coefficient relative to the reference position of the microphone array, and the local coordinate $\phi_i$ of the ith target sound source represents an angle of the ith target sound source relative to the jth microphone corresponding to the largest correlation coefficient.

The sound source position estimator estimates the local coordinate of the ith target sound source using Expression 10:

$$\phi_i = \text{sign}(\phi_i) \times \theta/2 \times (r'_{i2} - r'_{i3})/(r'_{i1} - r'_{i3}), \quad 0 \leq \phi_i \leq \theta/2, \quad \text{(Expression 10)}$$

where $\text{sign}(\phi_i)$ is the sign of the local coordinate $\phi_i$ of the ith target sound source, $r'_{i1}$ is a largest correlation coefficient among correlation coefficients of the ith target sound source rearranged according to magnitudes of the correlation coefficients, $r'_{i2}$ is a second largest correlation coefficient among the correlation coefficients of the ith target sound source rearranged according to the magnitudes thereof, and $r'_{i3}$ is a third largest correlation coefficient among the correlation coefficients of the ith target sound source rearranged according to the magnitudes thereof.

The local coordinate $\phi_i$ of the ith target sound source is positive if the ith target sound source is located at one side of a microphone corresponding to the largest correlation coefficient $r'_{i1}$, the one side thereof being the same as where the global coordinate $\psi_i$ is located, and is negative if the ith target sound source is located at the other side of the microphone corresponding to the largest correlation coefficient $r'_{i1}$, the other side thereof being opposite to where the global coordinate $\psi_i$ is located.

An absolute value of the local coordinate $\phi_i$ of the ith target sound source is defined as a linear function of the second largest correlation coefficient $r'_{i2}$ according to relations of Expression 8:

$$r'_{i2} = r'_{i3}, \text{ if } |\phi_i| = 0$$

$$r'_{i2} = r'_{i1}, \text{ if } |\phi_i| = \theta/2, \quad \text{(Expression 8)}$$

where $\theta$ is an angle between each of the microphones arranged at substantially equal intervals.

The microphone array includes a plurality of microphones arranged at substantially equal intervals in a line and the sound source position estimator estimates a global coordinate $D_i$ of an ith target sound source using Expression 11:

$$D_i = m_j + l_i, \quad \text{(Expression 11)}$$

where $m_j$ is a global coordinate of a jth microphone corresponding to a largest correlation coefficient with respect to a reference position of the microphone array, $l_i$ is a local coordinate of an ith target sound source with respect to the jth microphone, $D_i$ represents a distance of the ith target sound source from the reference position of the microphone array, the global coordinate $m_j$ of the jth microphone represents a distance of the jth microphone corresponding to the largest correlation coefficient from the reference position of the microphone array, and the local coordinate $l_i$ of the ith target sound source represents a distance of the ith target sound source from the jth microphone corresponding to the largest correlation coefficient.

The sound source position estimator estimates the local coordinate of the ith target sound source using Expression 12:

$$l_i = \text{sign}(l_i) \times d/2 \times (r'_{i2} - r'_{i3})/(r'_{i1} - r'_{i3}), \quad 0 \leq l_i \leq d/2, \quad \text{(Expression 12)}$$

where $\text{sign}(l_i)$ is the sign of the local coordinate $l_i$ of the ith target sound source, $r'_{i1}$ is a largest correlation coefficient among correlation coefficients of the ith target sound source rearranged according to magnitudes of the correlation coefficients, $r'_{i2}$ is a second largest correlation coefficient among the correlation coefficients of the ith target sound source rearranged according to the magnitudes thereof, and $r'_{i3}$ is a third largest correlation coefficient among the correlation coefficients of the ith target sound source rearranged according to the magnitudes thereof.

The local coordinate $l_i$ of the ith target sound source is positive if the ith target sound source is located at one side of a microphone corresponding to the largest correlation coefficient $r'_{i1}$, the one side thereof being the same as where the global coordinate $D_i$ is located, and is negative if the ith target sound source is located at the other side of the microphone corresponding to the largest correlation coefficient $r'_{i1}$, the other side thereof being opposite to where the global coordinate $D_i$ is located.

If a target sound source is located at one of both sides of the microphone array, the sound source position estimator roughly estimates a position of the target sound source, determining that the target sound source is located at one of both sides of the microphone array.

In accordance with another aspect of the embodiments, a method to track positions of multiple sound sources includes separating sound signals input to a microphone array into independent sound source signals, selecting a target sound source to be tracked by analyzing patterns of the separated sound source signals, estimating correlation coefficients between the sound signals input to the microphone array and the separated sound source signals and creating a correlation coefficient matrix using the estimated correlation coefficients, and estimating a position of the selected target sound source using the estimated correlation coefficients.

The sound source signal separation is performed using one of independent component analysis (ICA) and geometric source separation (GSS).

The target sound source selection is performed by matching patterns of the separated sound source signals with a preset target sound source signal pattern.

The estimation of the correlation coefficients includes obtaining correlation coefficients by performing cross-correlation between the sound signals input to the microphone array and the separated sound source signals.

The estimation of the position of the target sound source includes rearranging all correlation coefficients of the target sound source according to magnitudes of the correlation coefficients thereof and tracking a position of the target sound source using a global coordinate of the target sound source estimated using a preset number of correlation coefficients among the rearranged correlation coefficients.

When the microphone array includes a plurality of microphones arranged at substantially equal intervals in a circle, a global coordinate $\psi_i$ of an ith target sound source and a local coordinate $\phi_i$ of the ith target sound source are estimated using Expression 7 and Expression 10:

$$\psi_i = \omega_j + \phi_i, \quad \text{(Expression 7)}$$

where $\omega_j$ is a global coordinate of a jth microphone corresponding to a largest correlation coefficient with respect to a reference position of the microphone array, $\phi_i$ is a local coordinate of an ith target sound source with respect to the jth microphone, $\psi_i$ represents an angle of the ith target sound source relative to the reference position of the microphone array, the global coordinate $\omega_j$ of the jth microphone represents an angle of the jth microphone corresponding to the largest correlation coefficient relative to the reference position of the microphone array, and the local coordinate $\phi_i$ of the ith target sound source represents an angle of the ith target sound source relative to the jth microphone corresponding to the largest correlation coefficient, and $$\phi_i = \text{sign}(\phi_i) \times \theta/2 \times (r'_{i2} - r'_{i3})/(r'_{i1} - r'_{i3}), \quad 0 \leq \phi_i \leq \theta/2, \quad \text{(Expression 10)}$$

where sign($\phi_i$) is the sign of the local coordinate $\phi_i$ of the ith target sound source, $r'_{i1}$ is a largest correlation coefficient among correlation coefficients of the ith target sound source rearranged according to magnitudes of the correlation coefficients, $r'_{i2}$ is a second largest correlation coefficient among the correlation coefficients of the ith target sound source rearranged according to the magnitudes thereof, and $r'_{i3}$ is a third largest correlation coefficient among the correlation coefficients of the ith target sound source rearranged according to the magnitudes thereof.

When the microphone array includes a plurality of microphones arranged at substantially equal intervals in a line, a global coordinate $D_i$ of an ith target sound source and a local coordinate $l_i$ of the ith target sound source are estimated using Expression 11 and Expression 12:

$$D_i = m_j + l_i,  \quad \text{(Expression 11)}$$

where $m_j$ is a global coordinate of a jth microphone corresponding to a largest correlation coefficient with respect to a reference position of the microphone array, $l_i$ is a local coordinate of an ith target sound source with respect to the jth microphone, $D_i$ represents a distance of the ith target sound source from the reference position of the microphone array, the global coordinate $m_j$ of the jth microphone represents a distance of the jth microphone corresponding to the largest correlation coefficient from the reference position of the microphone array, and the local coordinate $l_i$ of the ith target sound source represents a distance of the ith target sound source from the jth microphone corresponding to the largest correlation coefficient, and $$l_i = \text{sign}(l_i) \times d/2 \times (r'_{i2} - r'_{i3})/(r'_{i1} - r'_{i3}), \; 0 \leq l_i \leq d/2, \quad \text{(Expression 12)}$$

where sign(li) is the sign of the local coordinate li of the ith target sound source, $r'_{i1}$ is a largest correlation coefficient among correlation coefficients of the ith target sound source rearranged according to magnitudes of the correlation coefficients, $r'_{i2}$ is a second largest correlation coefficient among the correlation coefficients of the ith target sound source rearranged according to the magnitudes thereof, and $r'_{i3}$ is a third largest correlation coefficient among the correlation coefficients of the ith target sound source rearranged according to the magnitudes thereof.

According to the embodiments, it may be possible to simultaneously and correctly track the positions of multiple sound sources, in an environment in which a variety of noise is present around the microphone array, while reducing the amount of calculation for position tracking.

BRIEF DESCRIPTION OF THE DRAWINGS

These and/or other aspects of the embodiments will become apparent and more readily appreciated from the following description of the embodiments, taken in conjunction with the accompanying drawings of which.

DETAILED DESCRIPTION

Figure 1:
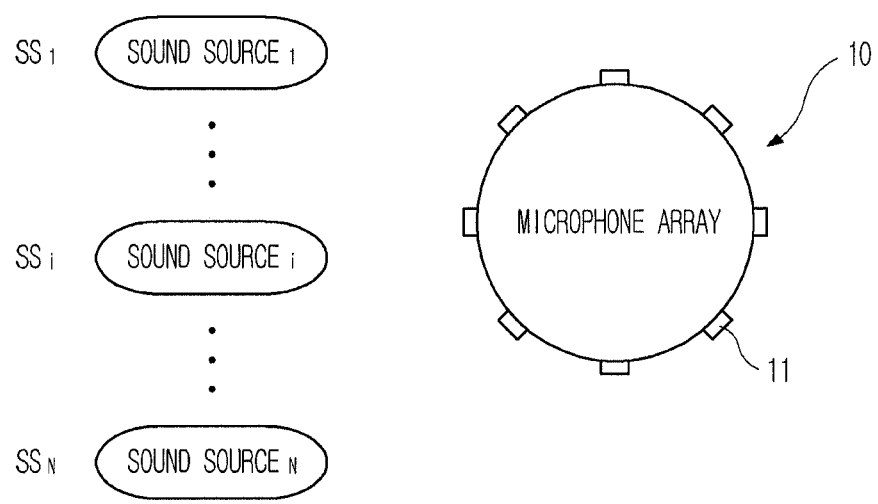
FIG. 1 illustrates an example in which multiple sound sources are located around a circular array of microphones according to an embodiment.

Reference will now be made in detail to the embodiments of the present invention, examples of which are illustrated in the accompanying drawings, wherein like reference numerals refer to like elements throughout.

In most indoor or outdoor environments, there is a need to take into consideration influence of sounds generated by a variety of sound sources including a speaker's voice. For example, there is a need to simultaneously track multiple sound sources in an indoor environment such as a house and an office in which a variety of electronic appliances, such as TVs, air conditioners, washing machines, and telephones, or office equipment, such as printers and fax machines, are provided or in an outdoor environment in which wind or vehicle noise is present.

Figure 2:
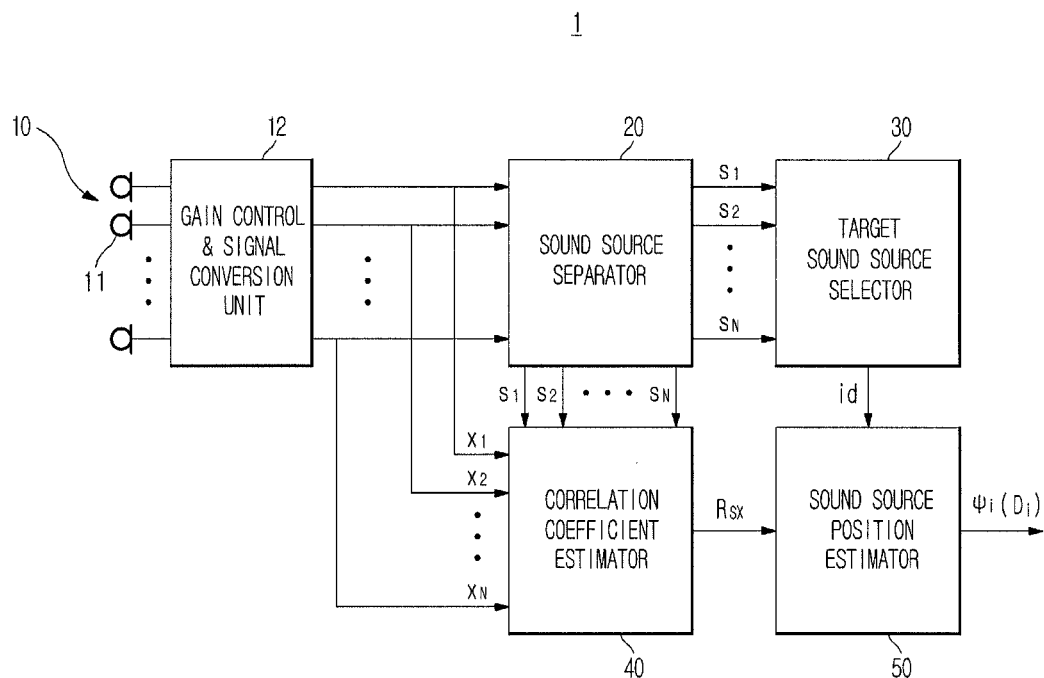
FIG. 2 is a block diagram of an apparatus to track positions of multiple sound sources according to an embodiment.

FIG. 1 illustrates an example in which multiple sound sources are located around a circular array of microphones according to an embodiment and FIG. 2 is a block diagram of an apparatus to track positions of multiple sound sources according to an embodiment.

As shown in FIG. 1, the microphone array 10 includes multiple microphones 11 arranged in a circle at equal intervals. The microphone array 10 is applicable to an electronic appliance, a service robot that supports household affairs, a surveillance camera that tracks sound sources to monitor intruders, a video camera used for multipoint video conferencing, etc.

When it is assumed that N sound sources $SS_1, \ldots, SS_i, \ldots, SS_N$ are located around the microphone array 10, sound signals generated from at least one sound source are input to each microphone 11.

In the case where at least one target sound source to be tracked is set among the N sound sources $SS_1, \ldots, SS_i, \ldots, SS_N$, there is a need to perform sound source separation to identify the target sound source and to track the position of the target sound source since the sound signals input to the microphone array 10 may include a mixture of sound signals generated not only from the target sound source but also from other sound sources. The target sound source may be singular or plural.

As shown in FIG. 2, an apparatus 1 to track positions of multiple sound sources according to an embodiment includes a microphone array 10, a gain control & signal conversion unit 12, a sound source separator 20, a target sound source selector 30, a correlation coefficient estimator 40, and a sound source position estimator 50.

Sound signals input to the microphone array 10 are provided to the sound source separator 20 and the correlation coefficient estimator 40 via the gain control & signal conversion unit 12. The gain control & signal conversion unit 12 controls the gain of each sound signal input to the microphone array 10 to change a sound source strength thereof to a desired level and samples the input sound signal to convert the same into a digital signal. Accordingly, N sampled sound signals $x_1, x_2, \ldots, x_N$, are provided to the sound source separator 20 and the correlation coefficient estimator 40.

Since the sound signals received by the sound source separator 20 may include a mixture of not only sound signals generated from the target sound source (for example, a speaker's voice) but also noise signals generated from other sound sources, the sound source separator 20 separates the received sound signals into N independent sound source signals $s_1, s_2, \ldots, s_N$ and provides the N separated sound source signals $s_1, s_2, \ldots, s_N$ to the target sound source selector 30 and the correlation coefficient estimator 40. Here, to perform sound source separation, the sound source separator 20 uses a blind source separation (BSS) method such as independent component analysis (ICA) or geometric source separation (GSS) method.

The target sound source selector 30 has a preset signal pattern for at least one target sound source. The target sound source selector 30 may select a target sound source signal from sound source signals input to the target sound source selector 30 by matching (i.e., comparing) the preset signal pattern of the target sound signal with a pattern of each separated sound source signal received from the sound source separator 20 and determining that the received sound source signal is the target sound source signal if the result of the matching is that the similarity between the two patterns is greater than a predetermined level. The target sound source selector 30 then creates an index id for identifying the target sound source signal selected by the target sound source selector 30 and provides the same to the sound source position estimator 50. The index id indicates which one of the separated sound source signals is the target sound source signal. The index id may indicate one or more sound source signals.

The correlation coefficient estimator 40 receives the N sound signals $x_1, x_2, \ldots, x_N$ gain-controlled and sampled by the gain control & signal conversion unit 12 and the N sound source signals $s_1, s_2, \ldots, s_N$ separated by the sound source separator 20 and estimates correlation coefficients between the signals $x_1, x_2, \ldots, x_N$ and $s_1, s_2, \ldots, s_N$ to create a correlation coefficient matrix $R_{SX}$ then provides the correlation coefficient matrix $R_{SX}$ to the sound source position estimator 50. The following is a detailed description of a procedure to create a correlation coefficient matrix $R_{SX}$.

The N gain-controlled and sampled sound signals $x_1, \ldots, x_i, \ldots, x_N$ and the N separated sound source signals $s_1, \ldots, s_i, \ldots, s_N$ are defined by the following Expressions 1 and 2.

$$X = [x_1 x_2 \ldots x_N]^T \quad \text{(Expression 1)}$$

$$S = [S_1 S_2 \ldots S_N]^T \quad \text{(Expression 2)}$$

The correlation coefficient estimator 40 performs cross-correlation on the signals defined by Expressions 1 and 2 using the following Expression 3.

$$r_{ij} = E\{s_i(t) \cdot x_j^*(t)\} \quad \text{(Expression 3)}$$

Here, $r_{ij}$ denotes a correlation coefficient between an ith separated sound source signal $s_i$ and a jth microphone sound signal $x_j$, $E\{\}$ denotes an expected value of $\{\}$, and * denotes complex conjugate of the signal when the signal is complex.

A correlation coefficient matrix $R_{SX}$ created from the correlation coefficients obtained by Expression 3 is represented by the following Expression 4.

$$R_{SX} = \begin{bmatrix} r_{11} & r_{12} & \ldots & r_{1N} \\ r_{21} & r_{22} & \ldots & r_{2N} \\ \vdots & \vdots & \ddots & \vdots \\ r_{N1} & r_{N2} & \ldots & r_{NN} \end{bmatrix} \quad \text{(Expression 4)}$$

The sound source position estimator 50 analyzes the correlation coefficient matrix $R_{SX}$ to estimate a global coordinate $\psi_i$ of the target sound source. The position of the target sound source can be tracked using the global coordinate $\psi_i$ of the target sound source.

The following is a detailed description of a procedure to estimate the global coordinate $\psi_i$ of the target sound source.

When a single sound source is present around the microphone array 10, a correlation coefficient corresponding to a signal input to a microphone 11 closest to the single sound source will be largest. Similarly, in the case where multiple sound sources are present around the microphone array 10, the largest of the correlation coefficients obtained by performing cross-correlation between the microphones and a single separated target sound source signal will correspond to a microphone 11 closest to the single target sound source even though a sound signal input to each microphone 11 includes a mixture of sound source signals generated from the multiple sound sources. If the angle of a single target sound source is identical to the angle of a specific microphone 11, a correlation coefficient obtained by performing cross-correlation between the single target sound source and the specific microphone 11 will be largest among all correlation coefficients. If the single target sound source is located at the front of the specific microphone 11 closest thereto, assuming that other external factors are excluded, two correlation coefficients obtained by performing cross-correlation between the specific microphone 11 and two adjacent microphones located at the left and right sides of the specific microphone 11 will be equal. If the single target sound source deviates from the front side of the closest microphone and leans to one of the adjacent microphones on the left or right side of the closest microphone, a correlation coefficient obtained by performing cross-correlation on the one adjacent microphone will be the second largest and a correlation coefficient obtained by performing cross-correlation on the other adjacent microphone will be the third largest.

If the single target sound source deviates from the middle between the two microphones and leans to one of the two microphones, the microphone to which the target sound source leans becomes closest to the target sound source as the angle of the target sound source changes.

The sound source position estimator 50 may identify 3 microphones located close to a single target sound source and estimate the angle of the target sound source using correlation coefficients obtained by performing cross-correlation with the 3 microphones.

If the single target sound source is located at the middle between two microphones so that the angle of the target sound source is equal to a half of the angle between the two microphones, two correlation coefficients obtained by performing cross-correlation with the two microphones will all be maximum. Respective correlation coefficients of two other microphones located respectively at one sides of the two microphones are the next largest correlation coefficients. If the two next largest correlation coefficients are equal, one of the next largest correlation coefficients is selected.

It is possible to reduce the amount of calculation since the 3 largest correlation coefficients in order of magnitude among all correlation coefficients of the correlation coefficient matrix $R_{SX}$ are used when estimating the position of the target sound source in the above manner.

Taking into consideration this fact, the sound source position estimator 50 rearranges, in order of magnitude, correlation coefficients obtained by performing cross-correlation between all microphones and the single target sound source among the correlation coefficients of the correlation coefficient matrix $R_{SX}$.

For example, the sound source position estimator 50 rearranges correlation coefficients $r_{i1}, r_{i2}, \ldots, r_{iN}$ corresponding to the row of the ith sound sources si among the N sound sources $s_1, \ldots, s_i, \ldots, s_N$ of the correlation coefficient matrix $R_{SX}$ according to the magnitudes of the correlation coefficients as follows.

$$|r_{i\sigma(1)}| > |r_{i\sigma(2)}| > \ldots > |r_{i\sigma(N)}| \quad \text{(Expression 5)}$$

Here, $\sigma(1)$ is a number assigned to the largest of the N values and $\sigma(N)$ is a number assigned to the smallest.

The correlation coefficients belonging to the row of the ith sound source $s_i$ rearranged as represented by Expression 5 may be briefly expressed as follows.

$$r'_{i1} > r'_{i2} > \ldots > r'_{iN} \quad \text{(Expression 6)}$$

Examples in which an ith sound source signal $s_i$ corresponds to one of a plurality of sound sources located around a circular microphone array 10 are described below with reference to FIGS. 3 and 4.

An angle of the sound source $s_i$ relative to a first microphone 11-1 corresponding to a largest correlation coefficient $r'_{i1}$ is defined as a local coordinate $\phi_i$ and an angle of the first microphone 11-1 relative to the reference position of the microphone array 10 is defined as a microphone coordinate $\omega_j$ and an angle of the target sound source $s_i$ relative to the reference position of the microphone array 10 is defined as a global coordinate $\psi_i$ of the target sound source. These definitions are represented by Expression 7.

$$\psi_i = \omega_j + \phi_i \quad \text{(Expression 7)}$$

According to Expression 7, the position of the target sound source si can be determined from the global coordinate $\psi_i$.

Figure 3:
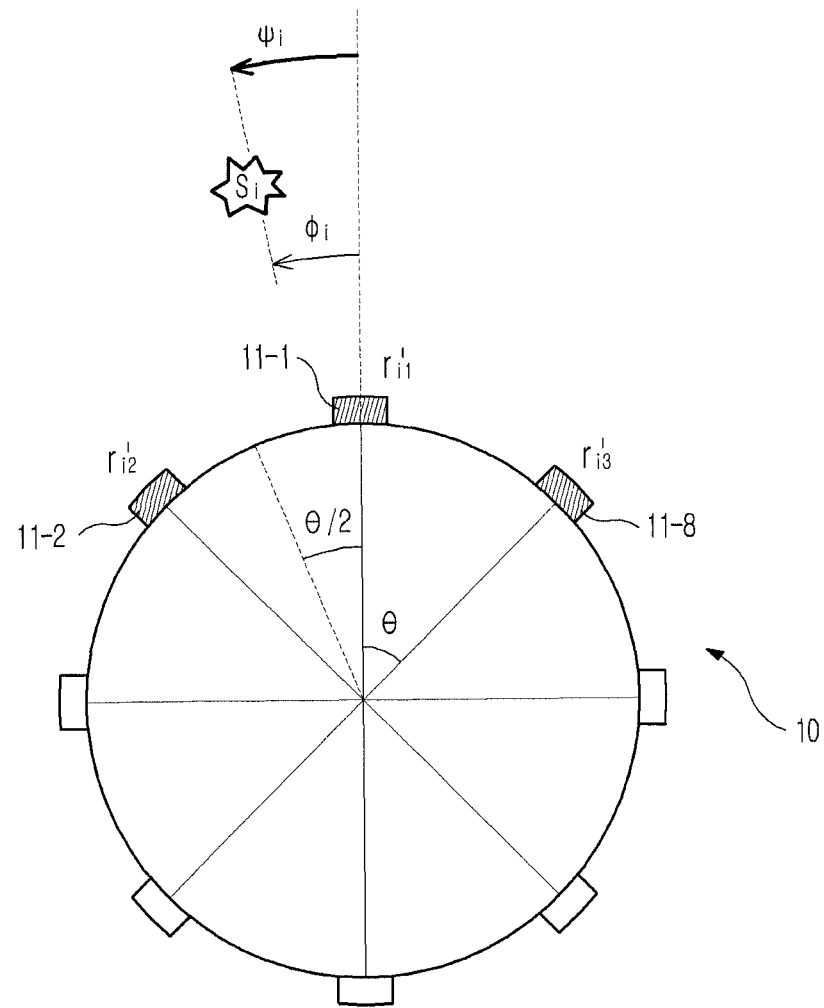
FIGS. 3 and 4 illustrate how the position of a target sound source is tracked according to an embodiment when a local coordinate of the target sound source is positive and when the local coordinate is negative, respectively.

In the case of FIG. 3, 3 microphones 11-1, 11-2, and 11-8 correspond respectively to 3 correlation coefficients $r'_{i1}$, $r'_{i2}$, and $r'_{i3}$ among the rearranged correlation coefficients. As shown in FIG. 3, the global coordinate ψi of the target sound source $s_i$ is equal to the local coordinate $\phi_i$ since the front side of the first microphone 11-1 corresponding to the largest correlation coefficient $r'_{i1}$ matches a preset reference position of the microphone array 10 such that the microphone coordinate $\omega_j$ is 0. When the target sound source $s_i$ is located at the left side of the first microphone 11-1, the local coordinate $\phi_i$ of the target sound source $s_i$ is positive and the correlation coefficient of the second microphone 11-2 relatively close to the target sound source $s_i$ from among the 2 microphones 11-2 and 11-8 located at both sides of the first microphone 11-1 is greater than the correlation coefficient of the third microphone 11-8. In this case, the global coordinate $\psi_i$ of the target sound source $s_i$ is obtained by summing the microphone coordinate ωj and the positive local coordinate $\phi_i$ using Expression 7.

Figure 4:
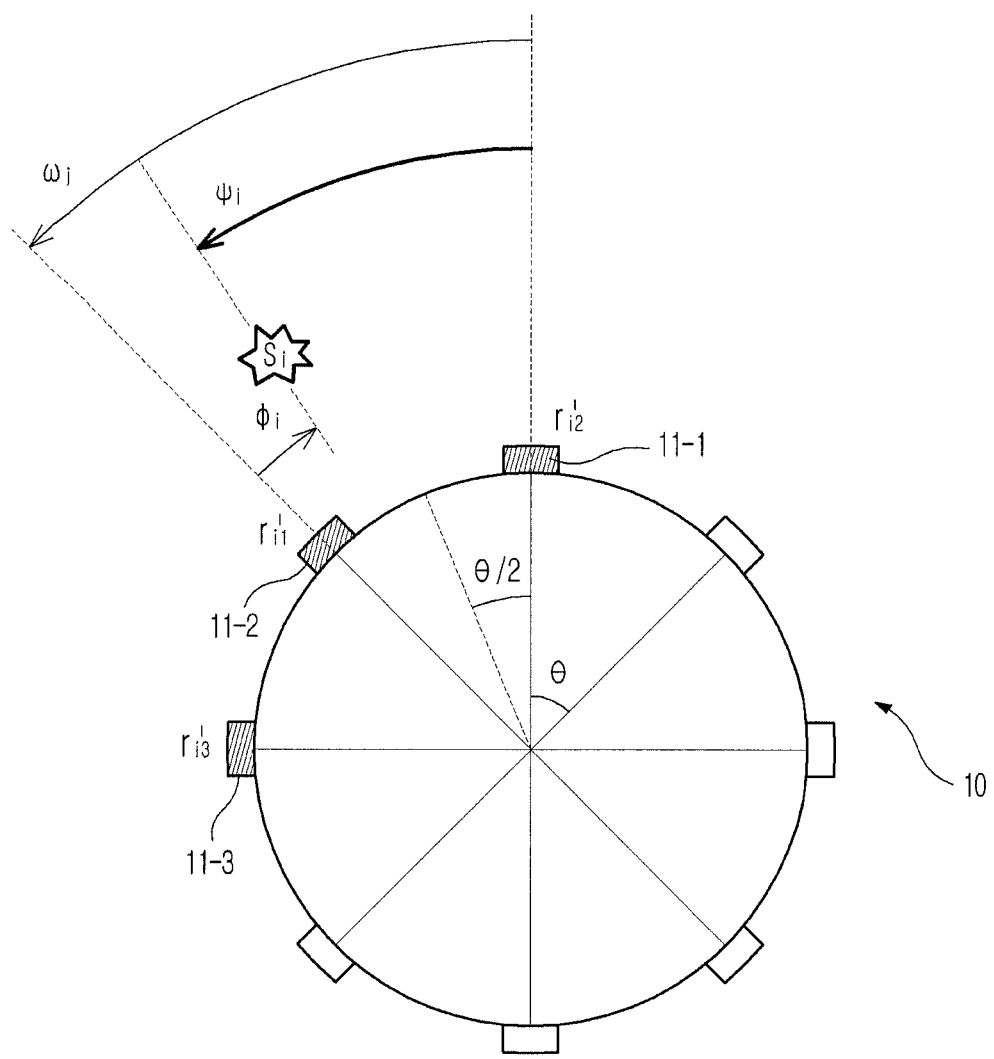

In the case of FIG. 4, 3 microphones 11-2, 11-1, and 11-3 correspond respectively to 3 correlation coefficients $r'_{i1}$, $r'_{i2}$, and $r'_{i3}$ among the rearranged correlation coefficients. As shown in FIG. 3, the front side of the first microphone 11-2 corresponding to the largest correlation coefficient $r'_{i1}$ does not match the preset reference position of the microphone array 10. When the target sound source $s_i$ is located at the right side of the first microphone 11-2, the local coordinate $\phi_i$ of the target sound source $s_i$ is negative and the correlation coefficient of the second microphone 11-1 relatively close to the target sound source $s_i$ from among the 2 microphones 11-1 and 11-3 located at both sides of the first microphone 11-2 is greater than the correlation coefficient of the third microphone 11-3. In this case, the global coordinate $\psi_i$ of the target sound source $s_i$ is obtained by summing the microphone coordinate ωj and the negative local coordinate $\phi_i$ using Expression 7.

The 3 correlation coefficients $r'_{i1}$, $r'_{i2}$, and $r'_{i3}$ and the absolute value $|\phi_i|$ of the local coordinate $\phi_i$ of the target sound source satisfy relations of Expression 8.

$$r'_{i2} = r'_{i3}, \text{ if } |\phi_i| = 0$$

$$r'_{i2} = r'_{i1}, \text{ if } |\phi_i| = \theta/2, \quad \text{(Expression 8)}$$

Figure 5:
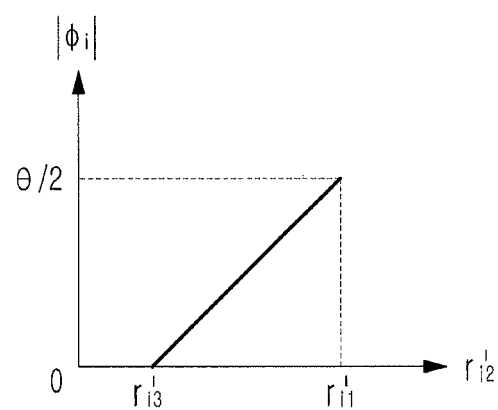
FIG. 5 is a graph illustrating a local coordinate of a target sound source according to an embodiment.

The absolute value $|\phi_i|$ of the local coordinate $\phi_i$ of the target sound source is defined as a linear function of the correlation coefficient $r'_{i2}$ as expressed in Expression 9 and can be represented by a graph of FIG. 5.

$$|\phi_i| = \theta/2 \times (r'_{i2} - r'_{i3})/(r'_{i1} - r'_{i3}) \quad \text{(Expression 9)}$$

Accordingly, the absolute value $|\phi_i|$ of the local coordinate $\phi_i$ of the target sound source can be obtained from the angle θ between each of the microphones arranged at equal intervals and the correlation coefficients $r'_{i1}$, $r'_{i2}$, $r'_{i3}$ corresponding to the 3 microphones close to the separated target sound source.

In addition, it is possible to determine the sign of the local coordinate $\phi_i$ of the target sound source, based on the fact that the local coordinate $\phi_i$ of the target sound source is positive if a microphone corresponding to the second largest correlation coefficient is located at the left side of a microphone corresponding to the largest correlation coefficient and is negative if a microphone corresponding to the second largest correlation coefficient is located at the right side of a microphone corresponding to the largest correlation coefficient.

This can be summarized by Expression 10.

$$\phi_i = \text{sign}(\phi_i) \times \theta/2 \times (r'_{i2} - r'_{i3})/(r'_{i1} - r'_{i3}), 0 \leq \phi_i \leq \theta/2, \quad \text{(Expression 10)}$$

Here, $\text{sign}(\phi_i)$ denotes the sign of the local coordinate $\phi_i$ of the target sound source. The microphone coordinates $\omega_j$ of the microphone array 10 are known since they have been preset.

The global coordinate $\psi_i$ of the target sound source may be estimated using Expression 7 after the local coordinate $\phi_i$ of the target sound source is estimated using Expression 10. The position of the target sound source may be estimated from the global coordinate $\psi_i$ of the target sound source estimated in this manner.

Even when multiple sound sources are present around the microphone array 10 and two or more of the multiple sound sources have been set as target sound sources to be tracked, it is possible to perform an operation to estimate the position of one of the target sound sources using 3 correlation coefficients while performing an operation to estimate the position of another target sound source using 3 correlation coefficients as described above.

Figure 7:
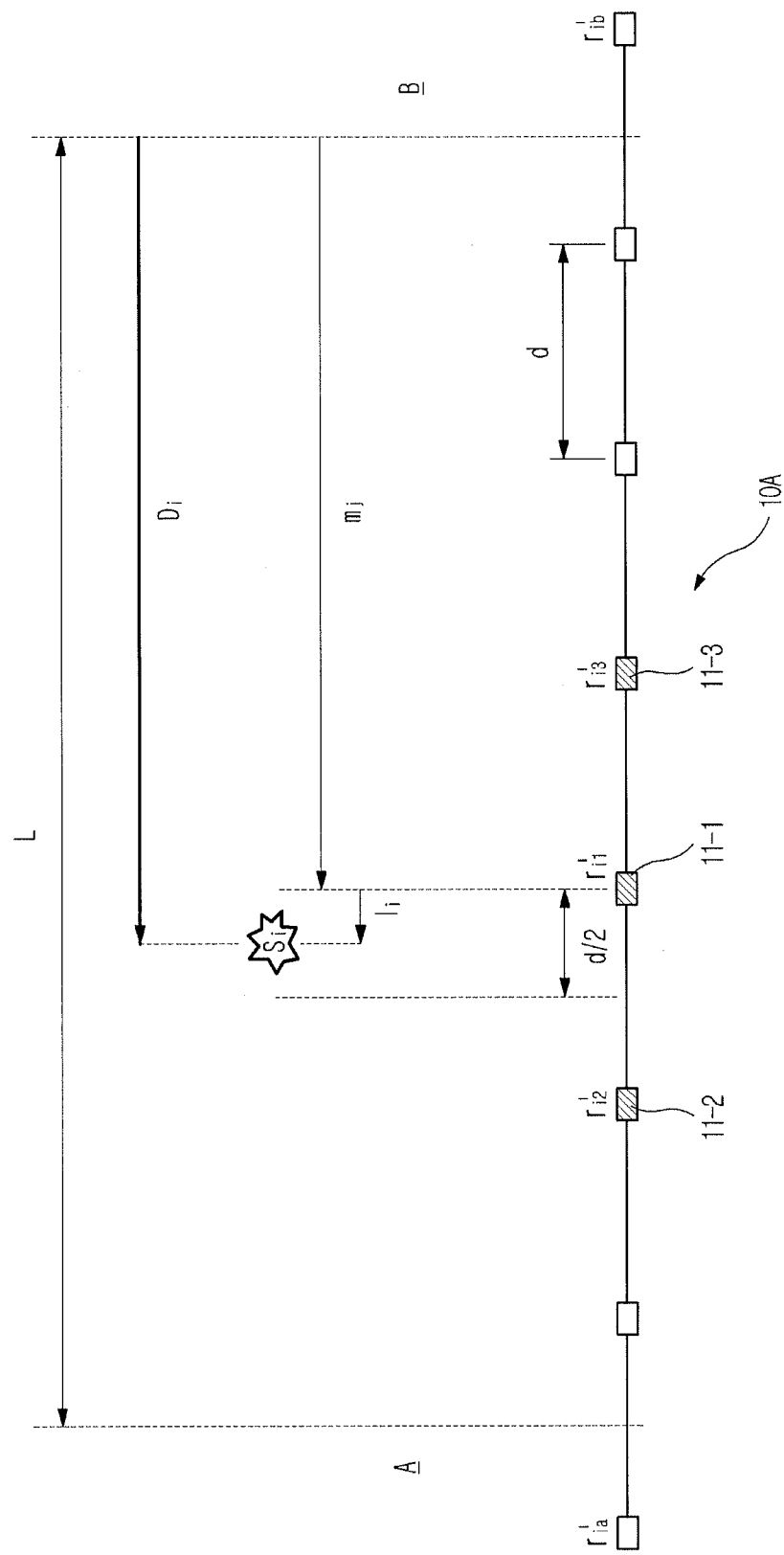
FIG. 7 illustrates how the position of a target sound source is tracked using an array of microphones arranged in a line according to an embodiment.

As is described later, the sound source position estimator 50 may estimate a global coordinate $D_i$ of at least one target sound source for an array of microphones 10A arranged in a line as shown in FIG. 7 and may estimate the position of the target sound source from the estimated global coordinate D.

Figure 6:
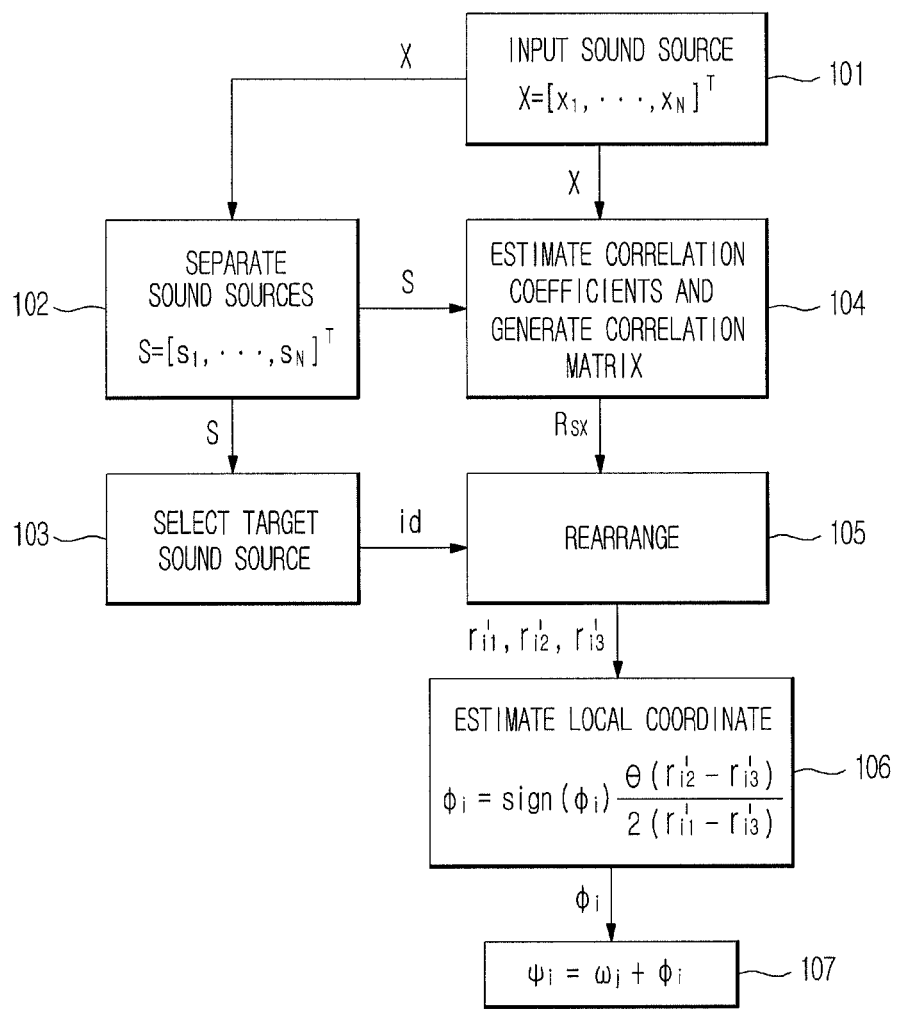
FIG. 6 is a flow chart illustrating a method to track positions of multiple sound sources according to an embodiment.

A method to track positions of multiple sound sources according to an embodiment is described below with reference to FIG. 6.

N sound signals are input to a microphone array 10 including N microphones arranged at equal intervals in a circle, a gain control & signal conversion unit 12 performs gain control and sampling on the input sound signals, and the N sampled sound signals are provided to a sound source separator 20 and a correlation coefficient estimator 40 (101).

The sound source separator 20 separates the N sampled sound signals into N independent sound source signals and provides the N independent sound source signals to a target sound source selector 30 and the correlation coefficient estimator 40. Here, to perform sound source separation, the sound source separator 20 uses a blind source separation (BSS) method such as independent component analysis (ICA) or geometric source separation (GSS) (102).

The target sound source selector 30 matches (i.e., compares) the patterns of the separated sound source signals S received from the sound source separator 20 with a preset target sound source signal pattern and selects a target sound source from the received sound sources (specifically, selects a target sound source signal from the received sound source signals) according to the matching result. The target sound source selector 30 then creates an index id for identifying the selected target sound source and provides the same to a sound source position estimator 50 (103).

The correlation coefficient estimator 40 performs cross-correlation between the N separated sound source signals S and the N sampled sound signals X using Expression 3 to obtain correlation coefficients and creates a correlation coefficient matrix $R_{SX}$ as represented by Expression 4 from the correlation coefficients and provides the correlation coefficient matrix $R_{SX}$ to the sound source position estimator 50 (104).

The sound source position estimator 50 identifies the target sound source to be tracked using the index id received from the target sound source selector 30 and rearranges correlation coefficients included in the correlation coefficient matrix $R_{SX}$ corresponding to the target sound source according to the magnitudes of the correlation coefficients. The sound source position estimator 50 individually performs the rearranging operation for each target sound source determined using the index id (105).

The sound source position estimator 50 then selects the 3 largest correlation coefficients in order of magnitude among the rearranged correlation coefficients and assigns a sequence number to each of the 3 rearranged correlation coefficients according to the order of magnitude. That is, the sound source position estimator 50 defines a microphone corresponding to the largest correlation coefficient as a first microphone, a microphone corresponding to the second largest correlation coefficient as a second microphone, and a microphone corresponding to the third largest correlation coefficient as a third microphone. The sound source position estimator 50 then estimates a local coordinate $\phi_i$ of the target sound source according to Expression 10 using the 3 correlation coefficients (106).

The sound source position estimator 50 then estimates a global coordinate $\psi_i$ of the target sound source according to Expression 7 using the estimated local coordinate $\phi_i$ of the target sound source. Here, even when two or more target sound sources to be tracked have been set, it is possible to perform an operation to estimate the position of one of the target sound sources using 3 correlation coefficients while performing an operation to estimate the position of another target sound source using 3 correlation coefficients as described above (107).

In an embodiment, a microphone array 10A including microphones 11 arranged in a line at equal intervals d may be provided to simultaneously track multiple target sound sources as shown in FIG. 7.

An area around the microphone array 10A is divided into a first region L and second regions A and B according to the positions of target sound sources. It is possible to perform sound source tracking using the 3 largest correlation coefficients as described above if a target sound source(s) to be tracked is located in the first region L.

It is possible to use only 2 correlation coefficients if a target sound source(s) to be tracked is located in the second region A or B which partially corresponds to the left or right side of the microphone array 10A. If a target sound source is located in the left second region A, it is possible to use a correlation coefficient $r'_{ia}$ of a microphone closest to the target sound source and a correlation coefficient of a microphone located at the right side of the closest microphone. On the other hand, if a target sound source is located in the right second region B, it is possible to use a correlation coefficient $r'_{ib}$ of a microphone closest to the target sound source and a correlation coefficient of a microphone located at the left side of the closest microphone. Here, it is not appropriate to perform sound source tracking using the above method since only two microphones, a microphone closest to the target sound source and a microphone located at one of both sides of the closest microphone, can be used. In this case, the position of the target sound source is roughly tracked such that it is determined that the target sound source is located in the second region A or B.

On the other hand, if the position of the sound source is changed from the second region A or B to the first region L, the position of the sound source located in the first region L is tracked using 3 correlation coefficients as described above.

An example in which a target sound source is located in the first region L is described below.

The same reference numerals as those of FIG. 2 are used in the following description since, when the microphone array 10 includes microphones arranged in a line, the apparatus to track positions of multiple sound sources may be implemented without adding hardware components to the apparatus of FIG. 2 as when the microphones of the microphone array 10 are arranged in a circle. The following description is given focusing on operations of the sound source position estimator 50 while operations of the microphone array 10, the gain control & signal conversion unit 12, the sound source separator 20, the target sound source selector 30, and the correlation coefficient estimator 40 are briefly described since the operations thereof are substantially identical to those described above.

The sound source position estimator 50 receives an index id for identifying a selected target sound source from the target sound source selector 30 and receives a correlation coefficient matrix $R_{SX}$ from the correlation coefficient estimator 40. The sound source position estimator 50 then rearranges correlation coefficients $r_{i1}, r_{i2}, \ldots, r_{iN}$ corresponding to the row of the ith sound sources $s_i$ of the N sound sources $s_1, \ldots, s_i, \ldots, s_N$ of the correlation coefficient matrix $R_{SX}$ according to the magnitudes of the correlation coefficients.

In the case of FIG. 7, 3 microphones 11-1, 11-2, and 11-3 correspond respectively to 3 correlation coefficients $r'_{i1}, r'_{i2}$, and $r'_{i3}$ among the rearranged correlation coefficients and a target sound source $s_i$ is located at the front left side of the first microphone 11-1 corresponding to the largest correlation coefficient $r'_{i1}$.

A global coordinate Di of the target sound source $s_i$ is obtained using Expression 11.

$$D_i = m_j + l_i,  \quad \text{(Expression 11)}$$

Here, $m_j$ is a microphone coordinate indicating a distance from the first microphone 11-1 corresponding to the largest correlation coefficient $r'_{i1}$ to the reference position of the microphone array 10A and $l_i$ is a local coordinate of the target sound source $s_i$ indicating a distance from the first microphone 11-1 corresponding to the largest correlation coefficient $r'_{i1}$.

As shown in FIG. 7, when the target sound source $s_i$ is located at the left side of the first microphone 11-1, the local coordinate $l_i$ of the target sound source $s_i$ is positive and the correlation coefficient $r'_{i2}$ of the second microphone 11-2 relatively close to the target sound source $s_i$ from among the 2 microphones 11-2 and 11-3 located at both sides of the first microphone 11-1 is greater than the correlation coefficient $r'_{i3}$ of the third microphone 11-3. In this case, the global coordinate $D_i$ of the target sound source $s_i$ is obtained by summing the microphone coordinate $m_j$ and the positive local coordinate $l_i$ using Expression 11.

When the target sound source $s_i$ is located at the right side of the first microphone 11-1, the local coordinate $l_i$ of the target sound source $s_i$ is negative. In this case, the global coordinate Di of the target sound source $s_i$ is obtained by summing the microphone coordinate $m_j$ and the negative local coordinate $l_i$ using Expression 11.

The 3 correlation coefficients $r'_{i1}$, $r'_{i2}$, and $r'_{i2}$ and the local coordinate $l_i$ of the target sound source satisfy relations of Expression 12.

$$r'_{i2} = r'_{i3}, \text{ if } |l_i| = 0$$

$$r'_{i2} = r'_{i1}, \text{ if } |l_i| = d/2$$

$$l_i = \text{sign}(l_i) \times d/2 \times (r'_{i2} - r'_{i3})/(r'_{i1} - r'_{i3}), \ 0 \leq l_i \leq d/2, \quad \text{(Expression 12)}$$

Here, sign($l_i$) denotes the sign of the local coordinate $l_i$ of the target sound source. The microphone coordinates $m_j$ of the microphone array 10A may be determined since they have been preset.

The global coordinate $D_i$ of the target sound source may be estimated using Expression 11 after the local coordinate $l_i$ of the target sound source is estimated using Expression 12. The position of the target sound source may be estimated from the global coordinate $D_i$ of the target sound source estimated in this manner.

Even when multiple sound sources are present around the microphone array 10A and two or more of the multiple sound sources have been set as target sound sources to be tracked, it is possible to perform an operation to estimate the position of one of the target sound sources using 3 correlation coefficients while performing an operation to estimate the position of another target sound source using 3 correlation coefficients as described above.

Figure 8:
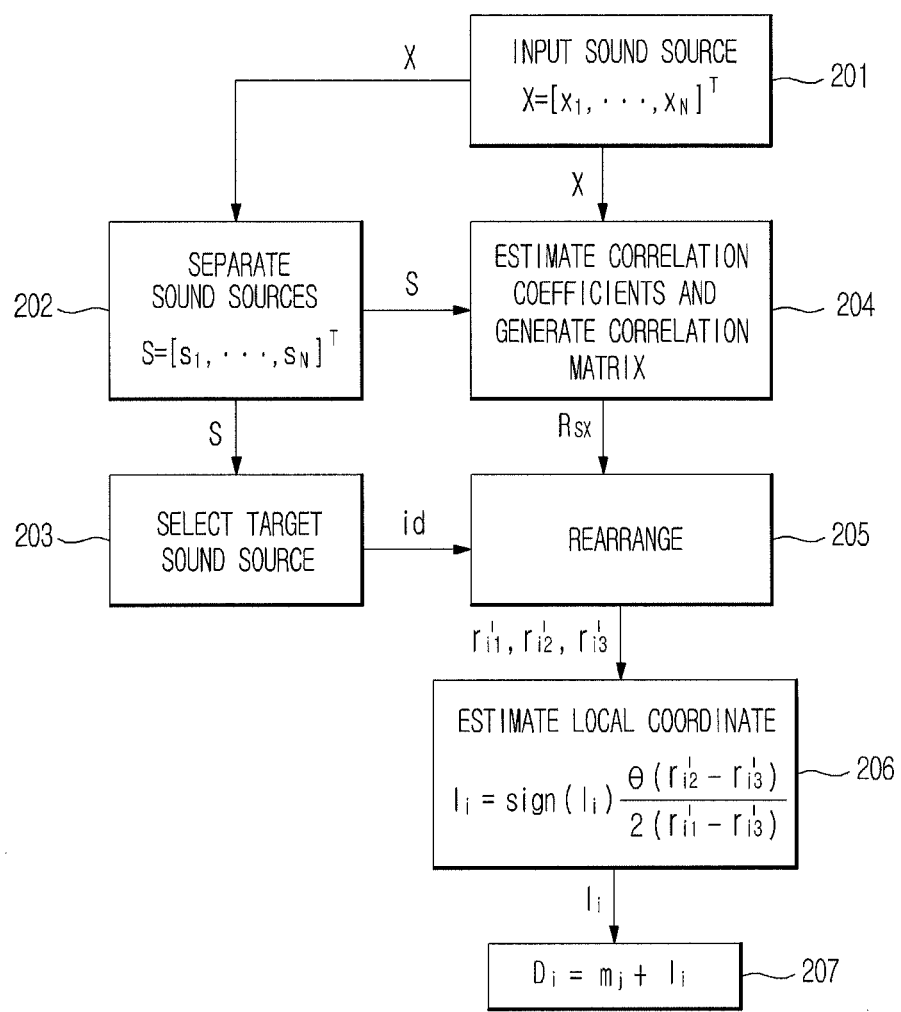
FIG. 8 is a flow chart illustrating a method to track positions of multiple sound sources according to an embodiment.

A method to track positions of multiple sound sources according to an embodiment is described below with reference to FIG. 8.

N sound signals are input to a microphone array 10A including N microphones arranged at equal intervals in a line, a gain control & signal conversion unit 12 performs gain control and sampling on the input sound signals, and the N sampled sound signals are provided to a sound source separator 20 and a correlation coefficient estimator 40 (201).

The sound source separator 20 separates the N sampled sound signals into N independent sound source signals and provides the N independent sound source signals to a target sound source selector 30 and the correlation coefficient estimator 40. Here, to perform sound source separation, the sound source separator 20 uses blind source separation (BSS) such as independent component analysis (ICA) or geometric source separation (GSS) (202).

The target sound source selector 30 matches (i.e., compares) the patterns of the separated sound source signals S received from the sound source separator 20 with a preset target sound source signal pattern and selects a target sound source from the received sound sources (specifically, selects a target sound source signal from the received sound source signals) according to the matching result. The target sound source selector 30 then creates an index id for identifying the selected target sound source and provides the same to a sound source position estimator 50 (203).

The correlation coefficient estimator 40 performs cross-correlation between the N separated sound source signals S and the N sampled sound signals X using Expression 3 to obtain correlation coefficients and creates a correlation coefficient matrix $R_{SX}$ as represented by Expression 4 from the correlation coefficients and provides the correlation coefficient matrix $R_{SX}$ to the sound source position estimator 50 (204).

The sound source position estimator 50 identifies the target sound source to be tracked using the index id received from the target sound source selector 30 and rearranges correlation coefficients included in the correlation coefficient matrix $R_{SX}$ corresponding to the target sound source according to the magnitudes of the correlation coefficients. The sound source position estimator 50 individually performs the rearranging operation for each target sound source determined using the index id.

The sound source position estimator 50 then selects the 3 largest correlation coefficients in order of magnitude among the rearranged correlation coefficients and assigns a sequence number to each of the 3 rearranged correlation coefficients according to the order of magnitude. That is, the sound source position estimator 50 defines a microphone corresponding to the largest correlation coefficient as a first microphone, a microphone corresponding to the second largest correlation coefficient as a second microphone, and a microphone corresponding to the third largest correlation coefficient as a third microphone. The sound source position estimator 50 then estimates a local coordinate $l_i$ of the target sound source according to Expression 12 using the 3 correlation coefficients (206).

The sound source position estimator 50 then estimates a global coordinate $D_i$ of the target sound source according to Expression 11 using the estimated local coordinate $l_i$ of the target sound source. Here, even when two or more target sound sources to be tracked have been set, it is possible to perform an operation to estimate the position of one of the target sound sources using 3 correlation coefficients while performing an operation to estimate the position of another target sound source using 3 correlation coefficients as described above (207). If a target sound source(s) to be tracked is located in the second region A or B which partially corresponds to the left or right side of the first region L, it is not appropriate to perform sound source tracking using the above method. Thus, in this case, the position of the target sound source is roughly tracked such that it is determined that the target sound source is located in the second region A or B (207).

As is apparent from the above description, according to the embodiments, it may be possible to simultaneously and correctly track the positions of multiple sound sources, in an environment in which a variety of noise is present around the microphone array, while reducing the amount of calculation for position tracking.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to track positions of multiple sound sources, the apparatus comprising:
    a microphone array to which sound signals of a plurality of sound sources are input;
    a sound source separator to separate the sound signals input to the microphone array into independent sound source signals;
    a target sound source selector to select a target sound source to be tracked by analyzing patterns of the separated sound source signals;
    a correlation coefficient estimator to estimate correlation coefficients between the sound signals input to the microphone array and the separated sound source signals and to create a correlation coefficient matrix using the estimated correlation coefficients; and a sound source position estimator to estimate a position of the selected target sound source using the estimated correlation coefficients, wherein the sound source position estimator rearranges all correlation coefficients of the target sound source according to magnitudes of the correlation coefficients thereof.

2. The apparatus according to claim 1, wherein the sound source separator performs sound source separation using a blind source separation (BSS) method.

3. The apparatus according to claim 2, wherein the BSS method includes one of independent component analysis (ICA) and geometric source separation (GSS).

4. The apparatus according to claim 1, wherein the target sound source selector selects the target sound source by matching patterns of the separated sound source signals with a preset target sound source signal pattern.

5. The apparatus according to claim 4, wherein the target sound source selector generates an index for identifying the selected target sound source.

6. The apparatus according to claim 1, wherein the correlation coefficient estimator obtains correlation coefficients by performing cross-correlation between the sound signals input to the microphone array and the separated sound source signals.

7. The apparatus according to claim 1, wherein, if a plurality of target sound sources to be tracked is present, the sound source position estimator performs simultaneous position tracking on the plurality of target sound sources.

8. The apparatus according to claim 1, wherein the sound source position estimator further tracks a position of the target sound source using a global coordinate of the target sound source estimated using a preset number of correlation coefficients among the rearranged correlation coefficients.

9. The apparatus according to claim 1, wherein the microphone array includes a plurality of microphones arranged at substantially equal intervals in a circle and the sound source position estimator estimates a global coordinate $\psi_i$ of an ith target sound source using Expression 1:

$$\psi_i = \omega_j + \phi_i, \quad \text{(Expression 1)}$$

where $\omega_j$ is a global coordinate of a jth microphone corresponding to a largest correlation coefficient with respect to a reference position of the microphone array, $\phi_i$ is a local coordinate of the ith target sound source with respect to the jth microphone, the global coordinate $\psi_i$ of the ith target sound source represents an angle of the ith target sound source relative to the reference position of the microphone array, the global coordinate $\omega_j$ of the jth microphone represents an angle of the jth microphone corresponding to the largest correlation coefficient relative to the reference position of the microphone array, and the local coordinate $\phi_i$ of the ith target sound source represents an angle of the ith target sound source relative to the jth microphone corresponding to the largest correlation coefficient.

10. The apparatus according to claim 9, wherein the sound source position estimator estimates the local coordinate of the ith target sound source using Expression 2:

$$\phi_i = \text{sign}(\phi_i) \times \theta/2 \times (r'_{i2} - r'_{i3})/(r'_{i1} - r'_{i3}), \quad 0 \leq \phi_i \leq \theta/2, \quad \text{(Expression 2)}$$

where $\text{sign}(\phi_i)$ is the sign of the local coordinate $\phi_i$ of the ith target sound source, $r'_{i1}$ is a largest correlation coefficient among correlation coefficients of the ith target sound source rearranged according to magnitudes of the correlation coefficients, $r'_{i2}$ is a second largest correlation coefficient among the correlation coefficients of the ith target sound source rearranged according to the magnitudes thereof, and $r'_{i3}$ is a third largest correlation coefficient among the correlation coefficients of the ith target sound source rearranged according to the magnitudes thereof.

11. The apparatus according to claim 10, wherein the local coordinate $\phi_i$ of the ith target sound source is positive if the ith target sound source is located at one side of a microphone corresponding to the largest correlation coefficient $r'_{i1}$, the one side thereof being the same as where the global coordinate $\psi_i$ is located, and is negative if the ith target sound source is located at the other side of the microphone corresponding to the largest correlation coefficient $r'_{i1}$, the other side thereof being opposite to where the global coordinate $\psi_i$ is located.

12. The apparatus according to claim 11, wherein an absolute value of the local coordinate $\phi_i$ of the ith target sound source is defined as a linear function of the second largest correlation coefficient $r'_{i2}$ according to relations of Expression 3:

$$r'_{i2} = r'_{i3}, \text{ if } |\phi_i| = 0$$

$$r'_{i2} = r'_{i1}, \text{ if } |\phi_i| = \theta/2, \quad \text{(Expression 3)}$$

where $\theta$ is an angle between each of the microphones arranged at substantially equal intervals.

13. The apparatus according to claim 1, wherein the microphone array includes a plurality of microphones arranged at substantially equal intervals in a line and the sound source position estimator estimates a global coordinate $D_i$ of an ith target sound source using Expression 4:

$$D_i = m_j + l_i, \quad \text{(Expression 4)}$$

where $m_j$ is a global coordinate of a jth microphone corresponding to a largest correlation coefficient with respect to a reference position of the microphone array, $l_i$ is a local coordinate of an ith target sound source with respect to the jth microphone, $D_i$ represents a distance of the ith target sound source from the reference position of the microphone array, the global coordinate $m_j$ of the jth microphone represents a distance of the jth microphone corresponding to the largest correlation coefficient from the reference position of the microphone array, and the local coordinate $l_i$ of the ith target sound source represents a distance of the ith target sound source from the jth microphone corresponding to the largest correlation coefficient.

14. The apparatus according to claim 13, wherein the sound source position estimator estimates the local coordinate of the ith target sound source using Expression 5:

$$l_i = \text{sign}(l_i) \times d/2 \times (r'_{i2} - r'_{i3})/(r'_{i1} - r'_{i3}), \quad 0 \leq l_i \leq d/2, \quad \text{(Expression 5)}$$

where $\text{sign}(l_i)$ is the sign of the local coordinate of the ith target sound source, $r'_{i1}$ is a largest correlation coefficient among correlation coefficients of the ith target sound source rearranged according to magnitudes of the correlation coefficients, $r'_{i2}$ is a second largest correlation coefficient among the correlation coefficients of the ith target sound source rearranged according to the magnitudes thereof, and $r'_{i3}$ is a third largest correlation coefficient among the correlation coefficients of the ith target sound source rearranged according to the magnitudes thereof.

15. The apparatus according to claim 14, wherein the local coordinate $l_i$ of the ith target sound source is positive if the ith target sound source is located at one side of a microphone corresponding to the largest correlation coefficient $r'_{i1}$, the one side thereof being the same as where the global coordinate $D_i$ is located, and is negative if the ith target sound source is located at the other side of the microphone corresponding to the largest correlation coefficient $r'_{i1}$, the other side thereof being opposite to where the global coordinate $D_i$ is located.

16. The apparatus according to claim 13, wherein, if a target sound source is located at an end of the microphone array, the sound source position estimator roughly estimates a position of the target sound source, determining that the target sound source is located at the end of the microphone array.

17. A method to track positions of multiple sound sources, the method comprising:
- separating sound signals input to a microphone array into independent sound source signals;
- selecting a target sound source to be tracked by analyzing patterns of the separated sound source signals;
- estimating correlation coefficients between the sound signals input to the microphone array and the separated sound source signals and creating a correlation coefficient matrix using the estimated correlation coefficients; and
- estimating a position of the selected target sound source using the estimated correlation coefficients,
- wherein the estimation of the position of the target sound source includes rearranging all correlation coefficients of the target sound source according to magnitudes of the correlation coefficients thereof.

18. The method according to claim 17, wherein the separating sound source signals uses a blind source separation (BSS) method.

19. The method according to claim 18, wherein the BSS method is performed using one of independent component analysis (ICA) and geometric source separation (GSS).

20. The method according to claim 17, wherein the target sound source selection is performed by matching patterns of the separated sound source signals with a preset target sound source signal pattern.

21. The method according to claim 17, wherein the estimation of the correlation coefficients includes obtaining correlation coefficients by performing cross-correlation between the sound signals input to the microphone array and the separated sound source signals.

22. The method according to claim 17, wherein the estimation of the position of the target sound source further includes tracking a position of the target sound source using a global coordinate of the target sound source estimated using a preset number of correlation coefficients among the rearranged correlation coefficients.

23. The method according to claim 17, wherein, when the microphone array includes a plurality of microphones arranged at substantially equal intervals in a circle, a global coordinate $\psi_i$ of an ith target sound source and a local coordinate $\phi_i$ of the ith target sound source are estimated using Expression 1 and Expression 10:

$$\psi_i = \omega_j + \phi_i, \quad \text{(Expression 1)}$$

where $\omega_j$ is a global coordinate of a jth microphone corresponding to a largest correlation coefficient with respect to a reference position of the microphone array, $\phi_i$ is a local coordinate of an ith target sound source with respect to the jth microphone, $\psi_i$ represents an angle of the ith target sound source relative to the reference position of the microphone array, the global coordinate $\omega_j$ of the jth microphone represents an angle of the jth microphone corresponding to the largest correlation coefficient relative to the reference position of the microphone array, and the local coordinate $\phi_i$ of the ith target sound source represents an angle of the ith target sound source relative to the jth microphone corresponding to the largest correlation coefficient, and $$\phi_i = \text{sign}(\phi_i) \times \theta/2 \times (r'_{i2} - r'_{i3})/(r'_{i1} - r'_{i3}),\ 0 \le \phi_i \le \theta/2, \quad \text{(Expression 2)}$$

where $\text{sign}(\phi_i)$ is the sign of the local coordinate $\phi_i$ of the ith target sound source, $r'_{i1}$ is a largest correlation coefficient among correlation coefficients of the ith target sound source rearranged according to magnitudes of the correlation coefficients, $r'_{i2}$ is a second largest correlation coefficient among the correlation coefficients of the ith target sound source rearranged according to the magnitudes thereof, and $r'_{i3}$ is a third largest correlation coefficient among the correlation coefficients of the ith target sound source rearranged according to the magnitudes thereof.

24. The method according to claim 17, wherein, when the microphone array includes a plurality of microphones arranged at substantially equal intervals in a line, a global coordinate $D_i$ of an ith target sound source and a local coordinate $l_i$ of the ith target sound source are estimated using Expression 4 and Expression 5:

$$D_i = m_j + l_i, \quad \text{(Expression 11)}$$

where $m_j$ is a global coordinate of a jth microphone corresponding to a largest correlation coefficient with respect to a reference position of the microphone array, $l_i$ is a local coordinate of an ith target sound source with respect to the jth microphone, $D_i$ represents a distance of the ith target sound source from the reference position of the microphone array, the global coordinate $m_j$ of the jth microphone represents a distance of the jth microphone corresponding to the largest correlation coefficient from the reference position of the microphone array, and the local coordinate $l_i$ of the ith target sound source represents a distance of the ith target sound source from the jth microphone corresponding to the largest correlation coefficient, and $$l_i = \text{sign}(l_i) \times d/2 \times (r'_{i2} - r'_{i3})/(r'_{i1} - r'_{i3}),\ 0 \le l_i \le d/2, \quad \text{(Expression 5)}$$

where $\text{sign}(l_i)$ is the sign of the local coordinate $l_i$ of the ith target sound source, $r'_{i1}$ is a largest correlation coefficient among correlation coefficients of the ith target sound source rearranged according to magnitudes of the correlation coefficients, $r'_{i2}$ is a second largest correlation coefficient among the correlation coefficients of the ith target sound source rearranged according to the magnitudes thereof, and $r'_{i3}$ is a third largest correlation coefficient among the correlation coefficients of the ith target sound source rearranged according to the magnitudes thereof.

25. A method to track positions of multiple sound sources, the method comprising:
- separating sound signals input to a microphone array into independent sound source signals;
- selecting a target sound source to be tracked by analyzing patterns of the separated sound source signals; and
- estimating a position of the selected target sound source using three largest magnitudes of correlation coefficients of a cross correlation between microphones of the array and the target sound source,
- wherein the estimation of the position of the target sound source includes rearranging all correlation coefficients of the target sound source according to magnitudes of the correlation coefficients thereof.

* * * * *

UNITED STATES PATENT AND TRADEMARK OFFICE
CERTIFICATE OF CORRECTION

PATENT NO.       : 8,773,952 B2                                    Page 1 of 1
APPLICATION NO.  : 12/911836
DATED            : July 8, 2014
INVENTOR(S)      : Ki Hoon Shin It is certified that error appears in the above-identified patent and that said Letters Patent is hereby corrected as shown below:

In the Claims

Column 15, Line 63 (Approx.), In Claim 10, delete

" $\varphi_i = \text{sign}(\varphi_i) \times \theta/2 \times (r_{i2} - r_{i3})/(r'_{i1} - r'_{i3}), 0 \leq \varphi_i \leq \theta/2,$ " and insert -- $\varphi_i = \text{sign}(\varphi_i) \times \theta/2 \times (r'_{i2} - r'_{i3})/(r'_{i1} - r'_{i3}), 0 \leq \varphi_i \leq \theta/2,$ --, therefor.

Column 16, Line 34 (Approx.), In Claim 13, delete " $D_i = m_j + l_{j,}$ " and insert -- $D_j = m_j + l_{j,}$ --, therefor.

Column 18, Line 40, In Claim 24, delete

" $l_i = \text{sign}(l_i) \times d/2 \times (r'_{i2} - r'_{i3})/(r'_{i1} - r'_{i3}), 0 \leq l_i \leq d/2,$ " and insert -- $l_i = \text{sign}(l_i) \times d/2 \times (r'_{i2} - r'_{i3})/(r'_{i1} - r'_{i3}), 0 \leq l_i \leq d/2,$ --, therefor.

Signed and Sealed this
Thirtieth Day of December, 2014

Michelle K. Lee
*Deputy Director of the United States Patent and Trademark Office*